United States Patent
Albers et al.

(10) Patent No.: US 7,077,438 B2
(45) Date of Patent: Jul. 18, 2006

(54) IMPACT BEAM FOR A VEHICLE BODY

(75) Inventors: Hartmut Albers, Althengstett (DE); Patrick Kim, Stuttgart (DE); Thomas Schuh, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 110 days.

(21) Appl. No.: 10/493,586

(22) PCT Filed: Sep. 4, 2002

(86) PCT No.: PCT/EP02/09889

§ 371 (c)(1),
(2), (4) Date: Nov. 17, 2004

(87) PCT Pub. No.: WO03/037668

PCT Pub. Date: May 8, 2003

(65) Prior Publication Data

US 2005/0077752 A1 Apr. 14, 2005

(30) Foreign Application Priority Data

Oct. 26, 2001 (DE) .............................. 101 53 025

(51) Int. Cl.
*B60R 19/02* (2006.01)
(52) U.S. Cl. .................. 293/102; 296/120; 296/146.6
(58) Field of Classification Search ............ 296/146.6; 293/102, 120, 132
See application file for complete search history.

(56) References Cited

U.S. PATENT DOCUMENTS

| | | | |
|---|---|---|---|
| 3,829,149 A * | 8/1974 | Stevens ................. | 296/187.03 |
| 4,013,317 A * | 3/1977 | Reidelbach et al. ..... | 296/146.6 |
| 4,020,202 A | 4/1977 | Kreft | |
| 4,090,734 A * | 5/1978 | Inami et al. ............ | 296/146.6 |
| 4,290,235 A * | 9/1981 | Jahnle et al. ............ | 49/502 |
| 4,290,641 A * | 9/1981 | Miyauchi et al. ........ | 296/146.6 |
| 4,378,394 A * | 3/1983 | Miura et al. ............. | 428/113 |
| 4,582,758 A * | 4/1986 | Bruce et al. ............. | 428/397 |
| 5,527,082 A | 6/1996 | Töpker et al. | |
| 5,756,167 A * | 5/1998 | Tamura et al. ........... | 428/31 |
| 5,914,163 A * | 6/1999 | Browne ................. | 428/36.1 |
| 5,950,393 A | 9/1999 | Stecker | |
| 6,390,534 B1 * | 5/2002 | Lee et al. ................. | 296/146.6 |
| 6,468,613 B1 * | 10/2002 | Kitano et al. ............. | 428/35.8 |
| 6,692,064 B1 * | 2/2004 | Porter ................... | 296/187.01 |

FOREIGN PATENT DOCUMENTS

| | | |
|---|---|---|
| DE | 3621697 A1 | 6/1986 |
| DE | 3838425 | * 11/1988 |
| DE | 40 31 680 | 4/1992 |
| DE | 41 33 144 | 4/1992 |
| DE | 92 10 257.3 | 7/1992 |
| DE | 198 13 092 | 9/1999 |
| EP | 0467 829 B1 | 7/1991 |
| JP | 57151422 | 9/1982 |
| JP | 6101732 | 4/1994 |
| WO | WO 9910168 | * 3/1999 |

* cited by examiner

OTHER PUBLICATIONS

Metal foam—from Wikipedia, printed Oct. 25, 2005 and last modified Aug. 11, 2005.*

*Primary Examiner*—H. Gutman

(57) ABSTRACT

The invention relates to an impact beam for a vehicle body, which has an oblong box-type hollow profile. In order to enable the impact beam to provide sufficient rigidity and strength in the event of an impact in spite of having a lightweight construction, it is proposed that an oblong, planar, fiber-reinforced plastic part is fitted at least on the rear side of the hollow profile, which side faces the vehicle.

17 Claims, 1 Drawing Sheet

IMPACT BEAM FOR A VEHICLE BODY

CROSS-REFERENCES TO RELATED APPLICATIONS

Figure 1:
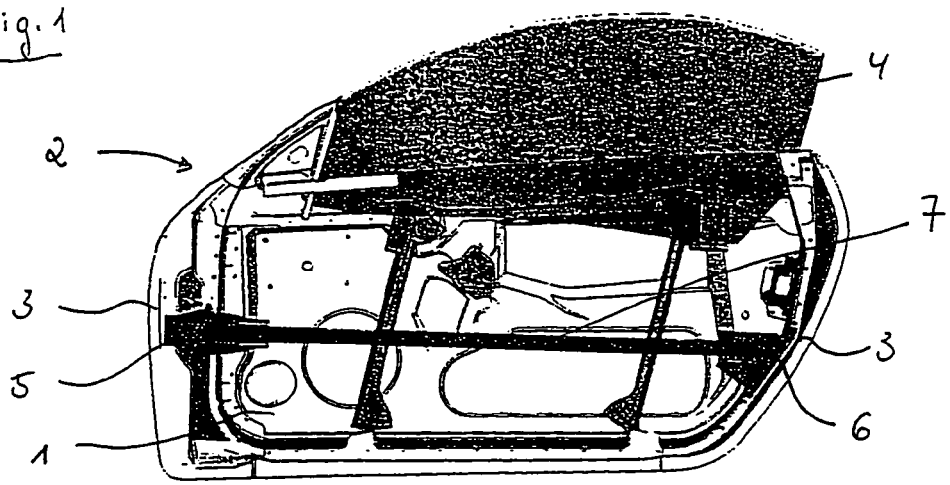

This application is a National Phase of international patent application no. PCT/EP02/09889, filed Sep. 4, 2002, the entire disclosure of which is incorporated herein by reference. Priority is claimed based on German patent application no. 101 53 025.0, filed Oct. 26, 2001.

BACKGROUND AND SUMMARY OF THE INVENTION

The invention relates to an impact beam for a vehicle body which has an oblong, box-type hollow profile.

An impact beam of the generic type is disclosed in EP 0 467 829 B1. The impact beam there is extruded and is designed as a box-type, elongate hollow profile. In this case, the hollow profile has an inner profile wall, which faces the vehicle interior and serves as an inner chord, and an opposite, outer profile wall, which serves as an outer chord. The two profile walls are connected to each other by transverse walls which have a comparatively small wall thickness in comparison with the profile walls. In order to obtain a uniform deformation of the beam during the impact and at the same time to counteract the collapse of the compression chord of the beam, the outer chord, holes which lie outside the center of gravity of the beam are to be provided in the outer chord. In spite of this measure, there is not sufficient security against a collapse during an impact. If, in addition, the lightweight construction aspect is important, the strength and rigidity of the beam are not very high if the beam consists of light metal.

The invention is based on the object of developing an impact beam of the generic type to the effect that the latter, despite a lightweight manner of construction, provides sufficient rigidity and strength in the event of an impact together with an increased absorption of energy.

The object is achieved according to the invention by an impact beam for a vehicle body with an oblong, box-type hollow profile, and an oblong, planar, fiber-reinforced plastic part fitted at least on the rear side of the hollow profile facing the vehicle interior.

The interaction of the hollow profile with a planar, fiber-reinforced plastic part concentrates the properties which are favorable in each case in respect of lightweight construction, rigidity and strength of the impact beam. The circumferentially closed nature of the hollow profile provides a high resistance for the beam against shearing forces while the fiber-reinforced plastic part counteracts the bending moment, which arises in the beam during an impact load, by means of the tension of its fibers which run parallel to the beam, and therefore contributes a high degree of elastic rigidity and strength in relation to bending and forces acting in the axial direction. In this case, the absorption of energy and the rupture-free deformation distance which can be obtained are particularly high. Owing to the planar box-type shape, a particular good attachment of the plastic part to the hollow profile is provided. The outlay for production of the beam according to the invention is low because of the ease with which the plastic part can be fitted and produced and the ease of which the hollow profile can be fitted. The invention also enables the formation of a beam which is substantially narrower and/or has a smaller wall thickness than conventional beams while the rigidity and strength remain the same. This enables more slender structures to be realized at a suitable location on the vehicle body without having to accept losses in rigidity and strength. In addition, the weight of the beam and therefore of the entire body is reduced. The beam can be used on the vehicle wherever only small curvatures occur and where loads act toward the vehicle. In this case, the beam can be used as a bending support for the bumper or as a part thereof, in the central part of the lateral roof frame or else as side impact protection. The use of a roof bow for connecting the B-pillars is likewise conceivable.

Other objects, advantages and novel features of the present invention will become apparent from the following detailed description of the invention when considered in conjunction with the accompanying drawings.

BACKGROUND DESCRIPTION OF THE DRAWINGS

Figure 2:
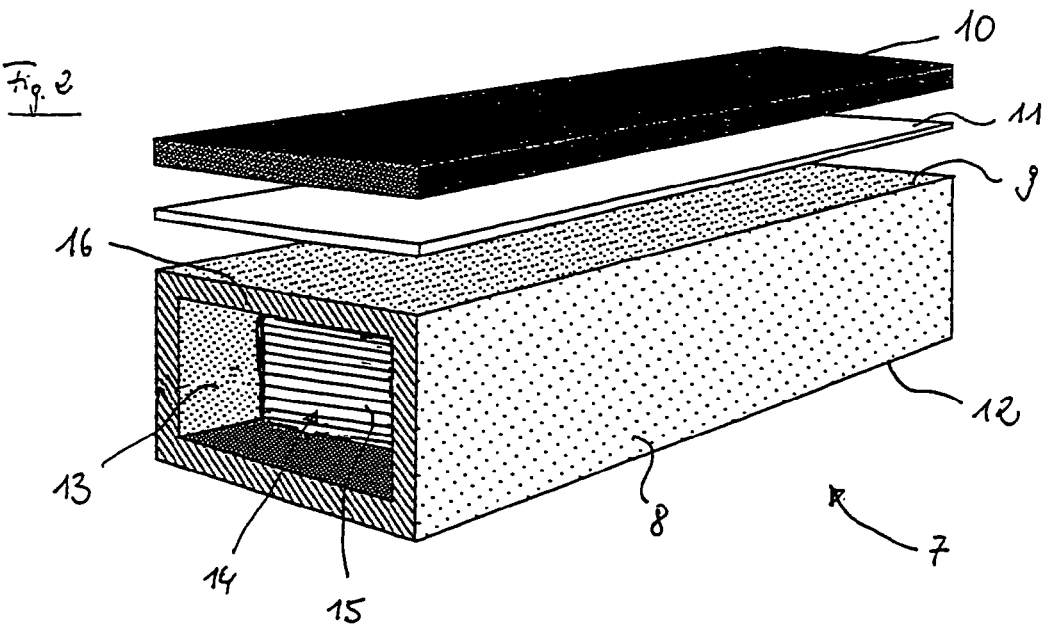
Figure 3:
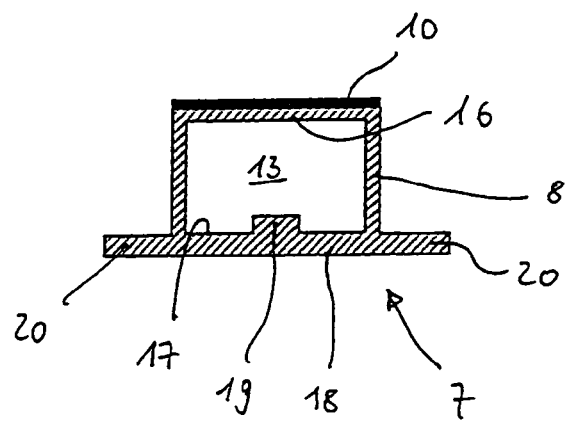

FIG. 1 shows a side view of an outer part of a motor vehicle door having an impact beam according to the invention, FIG. 2 shows a perspective view of an impact beam according to the invention having a wood core, FIG. 3 shows a cross section through an impact beam according to the invention having stabilizing flanges and a stiffening rib.

DETAILED DESCRIPTION OF THE DRAWINGS

FIG. 1 illustrates an inside 1 of the outer part of a side door 2 of a motor vehicle body, said side door comprises three shells, the inner part, outer part and paneling, and having an oblong cross-bracing, which runs in the longitudinal direction of the vehicle, fastened to its frame 3 below the window 4 by two ends 5 and 6. In this case, the cross-bracing forms an impact beam 7 which serves for the side impact protection.

The impact beam 7 is composed, on the one hand, of an oblong, box-type hollow profile 8 (FIG. 2) to which an oblong, planar, fiber-reinforced plastic part 10 is fitted on its rear side 9 which faces the vehicle interior. Although the types of fitting are diverse and also releasable connections between the plastic part 10 and the hollow profile 8, for example a riveting or screwing, are conceivable, a planar bonding is preferred for reasons concerned with an attachment which is as integral as possible and the resultant stability of the plastic part 10 and hollow profile 8 on each other and the aspect of keeping the diversity of parts as small as possible. For this purpose, an adhesive layer 11 which is placed between the plastic part 10 and hollow profile 8 is provided. To provide as optimum a bonding as possible, first of all two adhesive surfaces are pretreated, i.e. cleaned, and then a primer is applied to the adhesive surface of the hollow profile 8 and the adhesive layer 11 is applied to the adhesive surface of the plastic part 10. The two parts are then pressed together and the adhesive is cured by means of electromagnetic radiation, preferably heat radiation.

The hollow profile 8, which may also be designed as a multichamber profile to make the impact beam 7 particularly rigid, is formed, for reasons concerned with lightweight construction and in respect of a simple, cost-effective and rapid production process, from an aluminum extruded profile consisting of a high-strength aluminum alloy, for example AlMgSi 1. The aluminum hollow profile 8, like any other light metal hollow profile, gives the impact beam 7 high ductility and a high resistance to shearing. Furthermore, the formation of the hollow profile 8 as a metal hollow profile enables known, reliable joining techniques, for example screwing or bonding, to be used for attaching the impact beam 7 to the rest of the body structure.

The fiber-reinforced plastic part 10 is of lamellar design and, in its epoxy resin matrix, exclusively contains carbon fibers which run unidirectionally and extend along the plastic part 10. The matrix may also be formed from a thermoplastic, which improves the ability of the lamellar plastic part 10 to be preformed so as to match the shape in the body structure. Instead of the carbon fibers, aramid fibers, polyethylene or boron fibers, which surpass the tensile properties of carbon fibers but are relatively expensive, are likewise conceivable. This provides a very high elastic rigidity and strength—even after the aluminum has flowed in the event of a crash—for the impact support 7 composed of the bond of plastic part 10 and hollow profile 8, and an optimum resistance to the axial forces caused by the bending moment of the impact beam 7. Carbon-fiber-reinforced plastic having fibers lying unidirectionally (UD-CfP) have the best mixture of material properties among the materials possible for use in respect of the requirements set in conjunction with the lightweight construction. UD-CfP has a high tensile modulus with values greater than 150 GPa and a very high tensile strength of greater than 2200 Mpa, and a very low density of 1.6 g/cm$^3$. In addition, this material has good fatigue properties, thus providing a long service life in respect of the plastic part 10. The plastic part 10 is produced by pultrusion, as a result of which, on the one hand, a high fiber content and, on the other hand, a uniform distribution of the fibers in the matrix are achieved, which improves the effect of the plastic part for the impact beam.

It is indeed conceivable to fit a further plastic part 10 onto the front side 12 of the hollow profile 8. Although this would result in a further increase in the rigidity of the impact beam 7, the plastic part 10 fails relatively rapidly under the acting pressure load, with the result that an undesirably steep drop in absorption of energy and therefore in the deformation characteristic of the impact beam 7 occurs.

In order to stabilize the impact beam 7 against collapsing under an impact load, a supporting body 14 of a lightweight construction material is introduced into the interior 13 of the hollow profile 8 and fastened in the hollow profile 8. This can take place by simply pressing it in or likewise by means of bonding. The supporting body 14 can be arranged in the hollow profile 8 in such a manner that the hollow profile 8 is completely filled or else has an axially open chamber at both ends for the purpose of fitting the impact beam 7 on the door frame 3. The supporting body 14 may consist of a light metal molded foam which imparts additional rigidity to the impact beam. However, owing to the high elongation-at-break properties of the fibers and low costs, the supporting body 14 is preferably produced from wood. In a manner favorable for the lightweight construction, the wood used is balsa wood which is also easy to cut to size. The supporting body 14 of balsa wood should advantageously be arranged in such a manner that the microscopic rib structure 15 of the wood is oriented in the impact direction, thus resulting in a particularly good support. Overall, a distributed, plastic deformation of the impact beam 7 is obtained by the wood supporting body 14 during the impact, and as a result, a high load-bearing capacity of the plastic part 10 without the risk of breaking is ensured up to very high deformations. The plastic part 10 can therefore continue to be considerably loaded even in the highly deformed state. In order to increase the resistance of the plastic part 10 to bending moments, that wall 16 of the hollow profile 8 which is situated closest to the plastic part 10 can have a smaller wall thickness that of the opposite side (FIG. 3), since the tensioning action of the fibers of the plastic part 10 can therefore be more effective because of the reduced application of force. The neutral axis is displaced here away from the plastic part 10 toward the opposite wall 18. In addition, the reduction in wall thickness contributes significantly to an optimized lightweight construction.

A further increase in the rigidity and strength of the impact beam 7 can be obtained by the fact that, with the formation of the hollow profile 8, a stiffening rib 19, which starts from the inside 17 of the wall 18 lying opposite the plastic part 10 and protrudes into the interior 13 of the hollow profile 8, is integrally formed at the same time (FIG. 3). In principle, a plurality of stiffening ribs 19 may also be integrally formed. In the figure, this wall 18 has laterally extruding stabilizing flanges 20 which are likewise integrally formed at the same time and via which, on account of the resultant, larger engagement surface, more impact energy can be introduced into the impact beam 7 and consumed there, which shows in an improved protective action in relation to an impact. The hollow profile 8 is held in a dimensionally and functionally stable manner by the flanges 20 with respect to a collapse and buckling of the loading side (pressure side), i.e. the side of the hollow profile 8 on which the flanges 20 are arranged. The rib 19 increases the resistance of the flange 20 of the hollow profile 8 against buckling and collapsing and therefore delays the moment of collapse.

Overall, the impact beam 7 according to the invention provides a higher and early absorption of energy and therefore a smaller penetration depth of the impacting object, i.e. greater safety because of larger deformation distances with a simultaneously low weight. The weight of the aluminum/CfP bond is more than 40% lower than a comparable steel beam and more than 20% lower than a comparable beam of aluminum. With such a saving on weight, an increase in the elastic range by up to 40% in the rigidity in comparison with an aluminum beam is achieved. Furthermore, a strength like a component made of high-strength steel is obtained at a considerably lower weight. The ductile behavior is produced in such a manner that the CfP lamellar 10 remains intact even with a deflection of 450 mm and, as a result, a separation of the impact beam 7 does not occur.

Moreover, in respect of a further application for the impact beam 7, the latter is conceivable as a second strap on the inside of the door 2 instead of an upper flange edge reinforced in a complicated way.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An impact beam for a vehicle body, which has an oblong, box-type hollow profile, wherein an oblong, planar, fiber-reinforced plastic part is fitted at least on a rear side of the hollow profile, facing an interior of the vehicle body, wherein the hollow profile is filled with a supporting body of a lightweight material.

2. The impact beam as claimed in claim 1, wherein the supporting body consists of wood.

3. The impact beam as claimed in claim 2, wherein the wood is balsa wood.

4. The impact beam as claimed in claim 3, wherein the balsa wood is arranged in such a manner that a macroscopic rib structure of the wood is oriented in an impact direction.

5. The impact beam as claimed in claim 1, wherein the supporting body consists of a light metal molded foam.

6. An impact beam for a vehicle body, which has an oblong, box-type hollow profile, wherein an oblong, planar, fiber-reinforced plastic part is fitted at least on a rear side of the hollow profile, facing an interior of the vehicle body, wherein the hollow profile has at least one stiffening rib projecting into an interior of the hollow profile.

7. The impact beam as claimed in claim 6, wherein laterally protruding stabilizing flanges are arranged on a side of the hollow profile which faces away from the plastic part.

8. An impact beam for a vehicle body, which has an oblong, box-type hollow profile, wherein an oblong, planar, fiber-reinforced plastic part is fitted at least on a rear side of the hollow profile, facing an interior of the vehicle body, wherein the hollow profile has a smaller wall thickness on the side on which the plastic part is fitted than on the opposite side.

9. A vehicle body, comprising: an impact beam for the vehicle body, which has an oblong, box-type hollow profile, wherein an oblong, planar, fiber-reinforced plastic part is fitted at least on a rear side of the hollow profile, facing an interior of the vehicle body; and
a side door,
wherein the impact beam is fastened to the side door of vehicle body below a window and forms an oblong cross-bracing which runs in the longitudinal direction of the vehicle,
wherein at least one stiffening rib projects into an interior of the hollow profile.

10. A method of forming an impact beam for a vehicle body, comprising the steps of:
providing an oblong, box-type hollow profile beam, wherein at least one stiffening rib projects into an interior of the hollow profile beam; and
affixing an oblong, planar, fiber-reinforced plastic part on at least a rear side of the hollow profile beam which faces an interior of the vehicle body.

11. A method of forming a vehicle body, comprising the steps of:
providing an oblong, box-type hollow profile beam, wherein at least one stiffening rib projects into an interior of the hollow profile beam; and
affixing an oblong, planar, fiber-reinforced plastic part on at least a rear side of the hollow profile beam which faces an interior of the vehicle body; and
fastening the impact beam to a side door of the vehicle body below a window to form an oblong cross-bracing which runs in the longitudinal direction of the vehicle body.

12. A vehicle body, comprising:
an impact beam for the vehicle body, which has an oblong, box-type hollow profile, wherein an oblong, planar, fiber-reinforced plastic part is fitted at least on a rear side of the hollow profile, facing an interior of the vehicle body; and
a side door,
wherein the impact beam is fastened to the side door of vehicle body below a window and forms an oblong cross-bracing which runs in the longitudinal direction of the vehicle, and
wherein the hollow profile has a smaller wall thickness on the side on which the plastic part is fitted than on the opposite side.

13. A vehicle body, comprising:
an impact beam for the vehicle body, which has an oblong, box-type hollow profile, wherein an oblong, planar, fiber-reinforced plastic part is fitted at least on a rear side of the hollow profile, facing an interior of the vehicle body; and
a side door,
wherein the impact beam is fastened to the side door of vehicle body below a window and forms an oblong cross-bracing which runs in the longitudinal direction of the vehicle, and
wherein the hollow profile is filled with a supporting body of a lightweight material.

14. A method of forming an impact beam for a vehicle body, comprising the steps of:
providing an oblong, box-type hollow profile beam; and
affixing an oblong, planar, fiber-reinforced plastic part on at least a rear side of the hollow profile beam which faces an interior of the vehicle body, wherein the hollow profile beam has a smaller wall thickness on the side on which the plastic part is fitted than on the opposite side.

15. A method of forming an impact beam for a vehicle body, comprising the steps of:
providing an oblong, box-type hollow profile beam; and
affixing an oblong, planar, fiber-reinforced plastic part on at least a rear side of the hollow profile beam which faces an interior of the vehicle body, wherein the hollow profile beam is filled with a supporting body of a lightweight material.

16. A method of forming a vehicle body, comprising the steps of:
providing an oblong, box-type hollow profile beam; and
affixing an oblong, planar, fiber-reinforced plastic part on at least a rear side of the hollow profile beam which faces an interior of the vehicle body, wherein the hollow profile beam has a smaller wall thickness on the side on which the plastic part is fitted than on the opposite side; and
fastening the impact beam to a side door of the vehicle body below a window to form an oblong cross-bracing which runs in the longitudinal direction of the vehicle body.

17. A method of forming a vehicle body, comprising the steps of:
providing an oblong, box-type hollow profile beam; and
affixing an oblong, planar, fiber-reinforced plastic part on at least a rear side of the hollow profile beam which faces an interior of the vehicle body, wherein the hollow profile beam is filled with a supporting body of a lightweight material; and
fastening the impact beam to a side door of the vehicle body below a window to form an oblong cross-bracing which runs in the longitudinal direction of the vehicle body.

* * * * *